United States Patent
Ja (10) Patent No.: US 12,339,432 B2
(45) Date of Patent: Jun. 24, 2025

(54) METHODS AND SYSTEMS FOR AN ADAPTIVE ILLUMINATION SYSTEM FOR IMAGING APPLICATIONS

(71) Applicant: Araceli Biosciences Inc., Tigard, OR (US)

(72) Inventor: Shiou-jyh Ja, Portland, OR (US)

(73) Assignee: ARACELI BIOSCIENCES INC., Tigard, OR (US)

(*) Notice: Subject to any disclaimer, the term of this patent is extended or adjusted under 35 U.S.C. 154(b) by 868 days.

(21) Appl. No.: 17/140,962

(22) Filed: Jan. 4, 2021

(65) Prior Publication Data
US 2022/0217261 A1 Jul. 7, 2022

(51) Int. Cl.
*G02B 21/06* (2006.01)

(52) U.S. Cl.
CPC .................... *G02B 21/06* (2013.01)

(58) Field of Classification Search
CPC .................. G02B 9/12; G02B 21/06
See application file for complete search history.

(56) References Cited

U.S. PATENT DOCUMENTS

| | | | |
|---|---|---|---|
| 2004/0263977 A1* | 12/2004 | Toyoda | G03F 7/70158 359/558 |
| 2008/0013169 A1 | 1/2008 | Korpinen et al. | |
| 2010/0302630 A1 | 12/2010 | Paulus | |
| 2011/0235171 A1* | 9/2011 | Dohi | G02B 15/142 359/385 |
| 2018/0084199 A1* | 3/2018 | Duckett, III | G02B 15/143507 |

FOREIGN PATENT DOCUMENTS

JP 2009008701 A * 1/2009

OTHER PUBLICATIONS

JP-2009008701-A, translation (Year: 2009).*

* cited by examiner

*Primary Examiner* — Wen Huang
(74) *Attorney, Agent, or Firm* — McCoy Russell LLP (57) ABSTRACT

Methods and systems are provided for an adaptive illumination system. In one example, an adaptive illumination system comprises an adaptive illuminator comprising at least three optical elements including a first optical element, a second optical element, and a third optical element, wherein a distance between the first optical element and the second optical element is adjustable.

7 Claims, 6 Drawing Sheets

METHODS AND SYSTEMS FOR AN ADAPTIVE ILLUMINATION SYSTEM FOR IMAGING APPLICATIONS

FIELD

Embodiments of the subject matter disclosed herein relate to an optical sub-system configured to adjust to enhance its performance during different illumination applications without hardware changes.

BACKGROUND

In some examples, illumination optics for transmission or fluorescence imaging systems may be used to achieve a desired image quality. The demands for a size of an illumination zone, uniformity of an intensity distribution, and an angle of the illumination may be different for different applications. For example, the fluorescence imaging system may desire higher irradiance, a large illumination zone, and a high uniformity of the intensity distribution independent of an illumination incident angle. The transmission imaging system with a large numerical aperture objective lens may demand a high illumination incident angle to support a high resolution performance of the imaging system. During some conditions, the illumination angle may be reduced to gain more contrast in a final image. Thus, a universal illumination system configured to suit various demands from different applications is desired.

BRIEF DESCRIPTION

In one example, at least some of the above issues may be at least partially addressed by an adaptive illumination system comprising an adaptive illuminator comprising at least three optical elements including a first optical element, a second optical element, and a third optical element, wherein a distance between the first optical element and the second optical element is adjustable.

The adaptive illuminator is designed to adjust the distance between the first optical element and the second optical element to adjust one or more illumination characteristics of the adaptive illumination system. The adaptive illuminator is further configured to increase a beam waist of a light passing therethrough, which may utilize a light source with smaller light collection optics relative to optical systems unable to increase the beam waist. As such, a packaging size and a cost of the light source are reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to systems and methods for an illumination system comprising a moveable lens. The moveable lens may be moved to adjust an illumination zone size and an illumination incident angle for different applications. The adaptive illumination system may receive a smaller beam waist from an upstream light source to provide a similar performance of an input light comprising a larger beam waist. By doing this, the size of the upstream light source may be reduced, which may decrease costs and physical size of the system.

Figure 1:
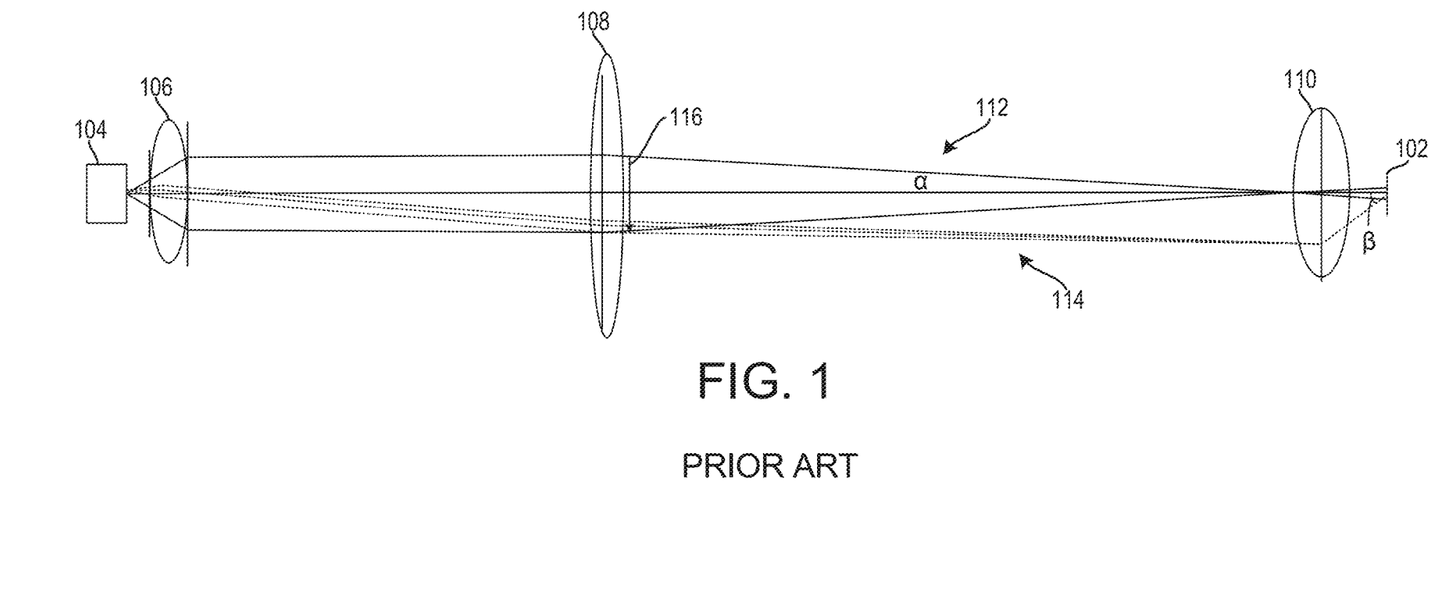
FIG. 1 shows an illumination system using a Kohler illumination of a previous example.
Figure 2A:
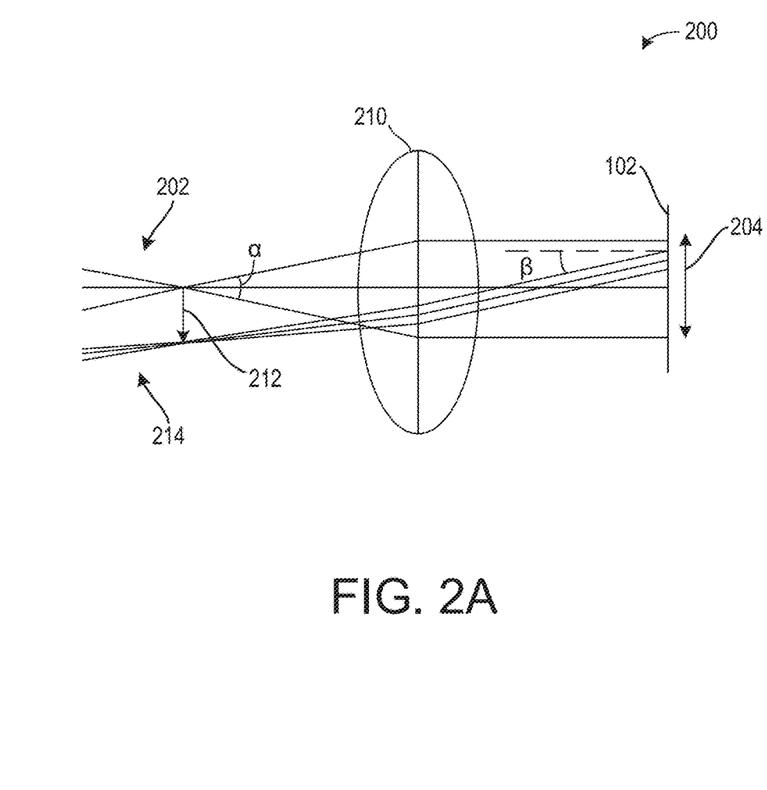
FIG. 2A shows a converging beam comprising a larger cone angle
Figure 2B:
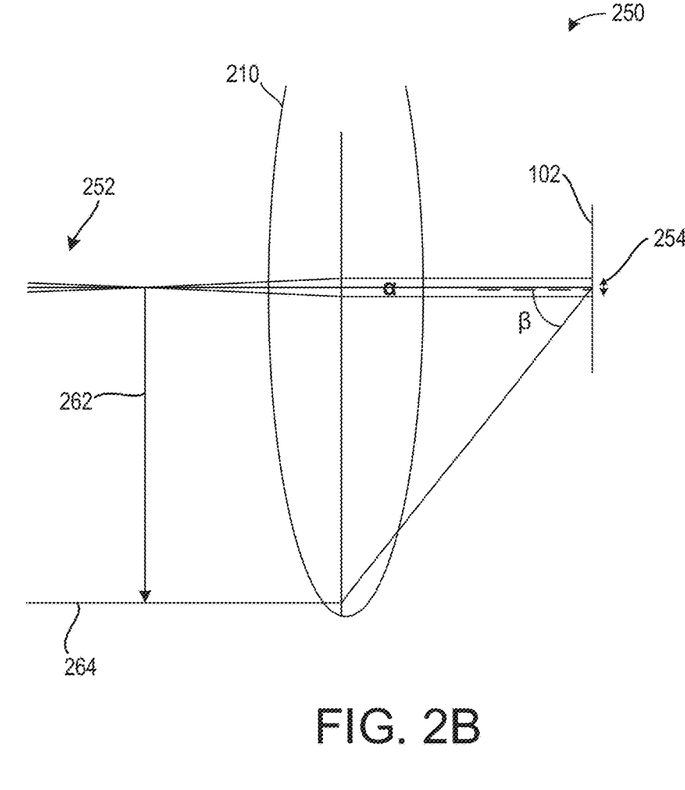
FIG. 2B shows a converging beam comprising a smaller cone angle.
Figure 3A:
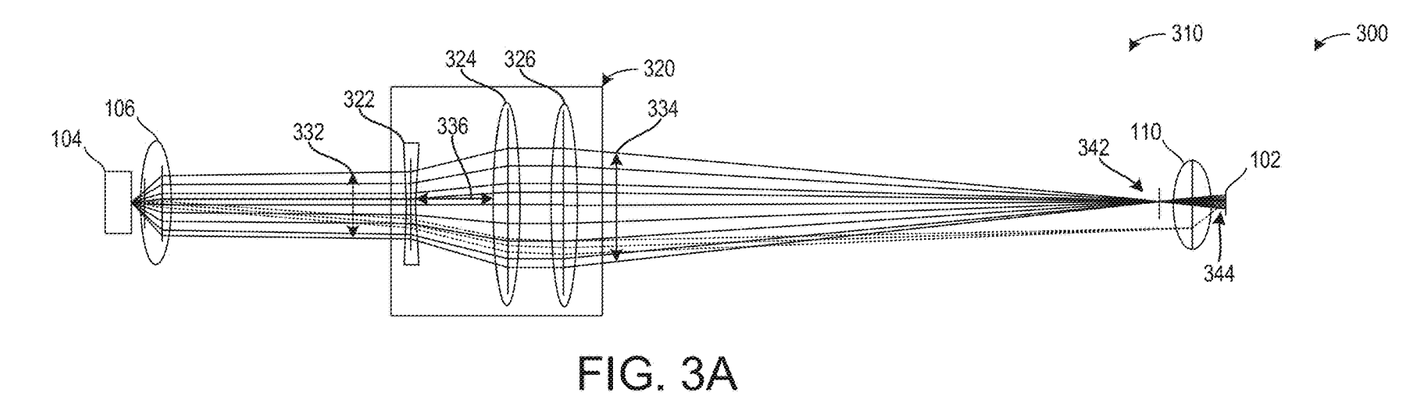
FIG. 3A shows a first layout of optics of an adaptive illumination system.
Figure 3B:
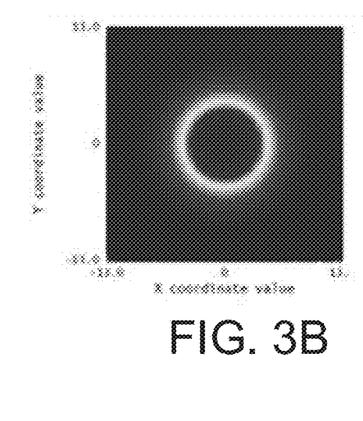
FIG. 3B shows a projected image on the back aperture of the focusing lens of the first layout of an adaptive illumination system.
Figure 3C:
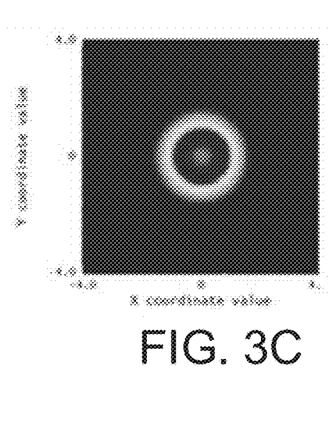
FIG. 3C shows a simulated illumination zone of the first layout at the target plane.
Figure 3D:
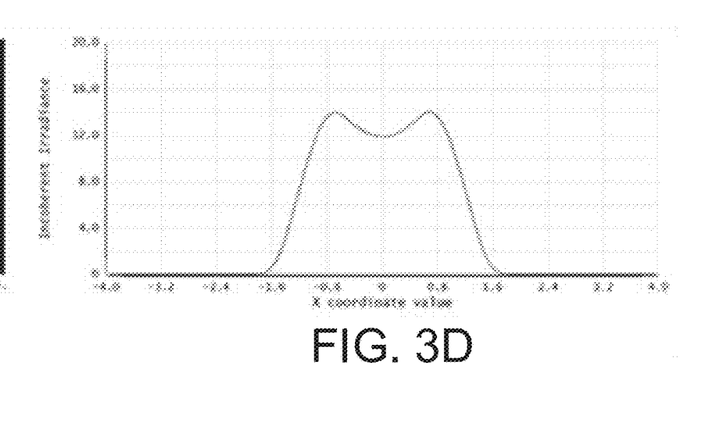
FIG. 3D shows a cross-section of irradiance intensity of the illumination zone of the first layout.
Figure 4A:
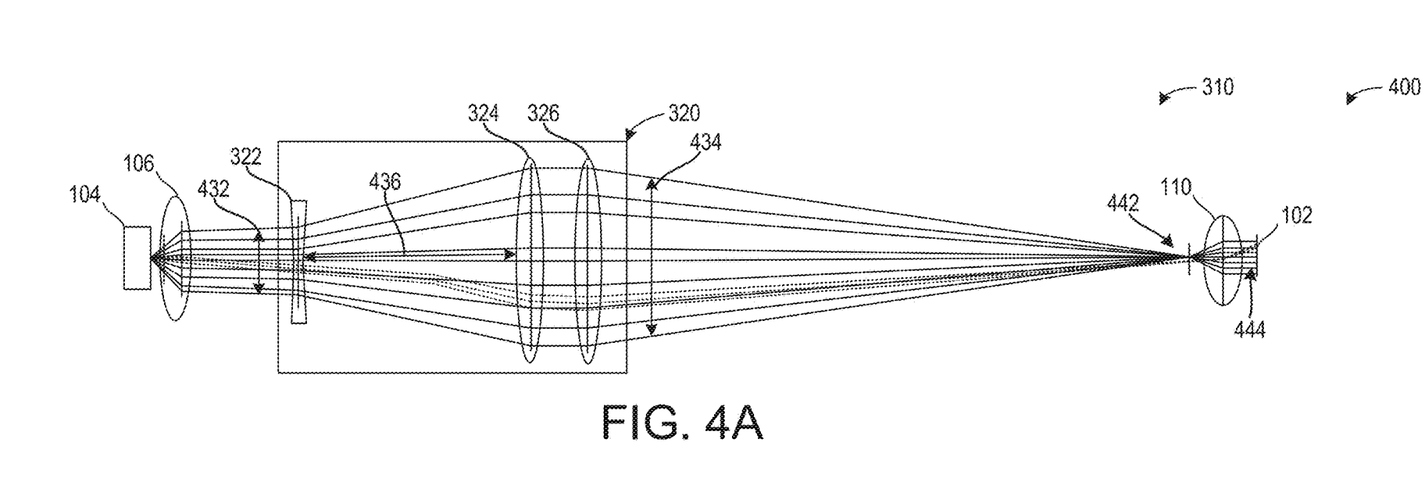
FIG. 4A shows a second layout of optics of the adaptive illumination system.
Figure 4B:
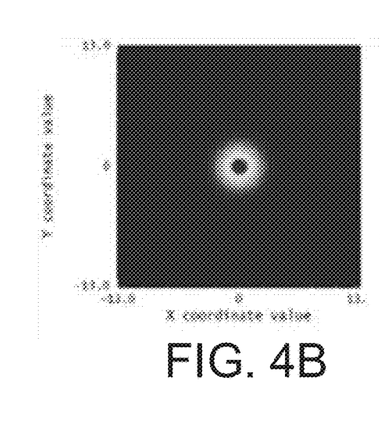
FIG. 4B shows a projected image on the back aperture of the focusing lens of the second layout of the adaptive illumination system.
Figure 4C:
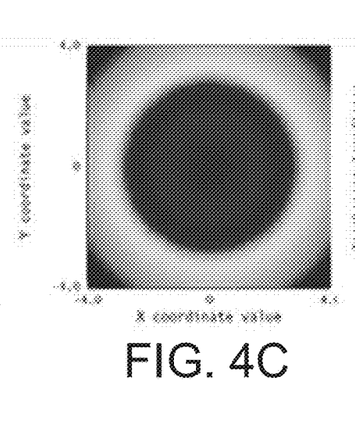
FIG. 4C shows a simulated illumination zone of the second layout at the target plane.
Figure 4D:
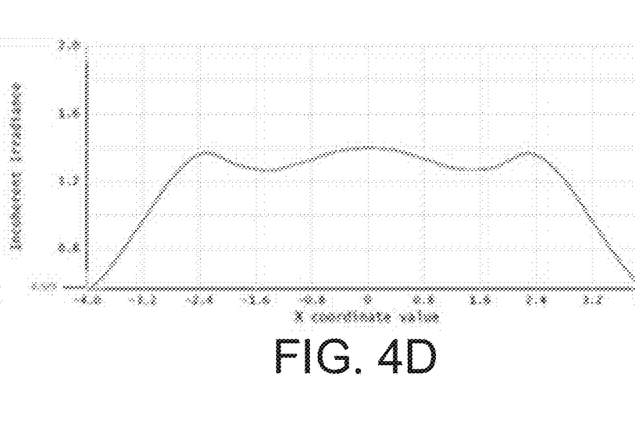
FIG. 4D shows a cross-section of irradiance intensity of the illumination zone of the second layout.
Figure 5A:
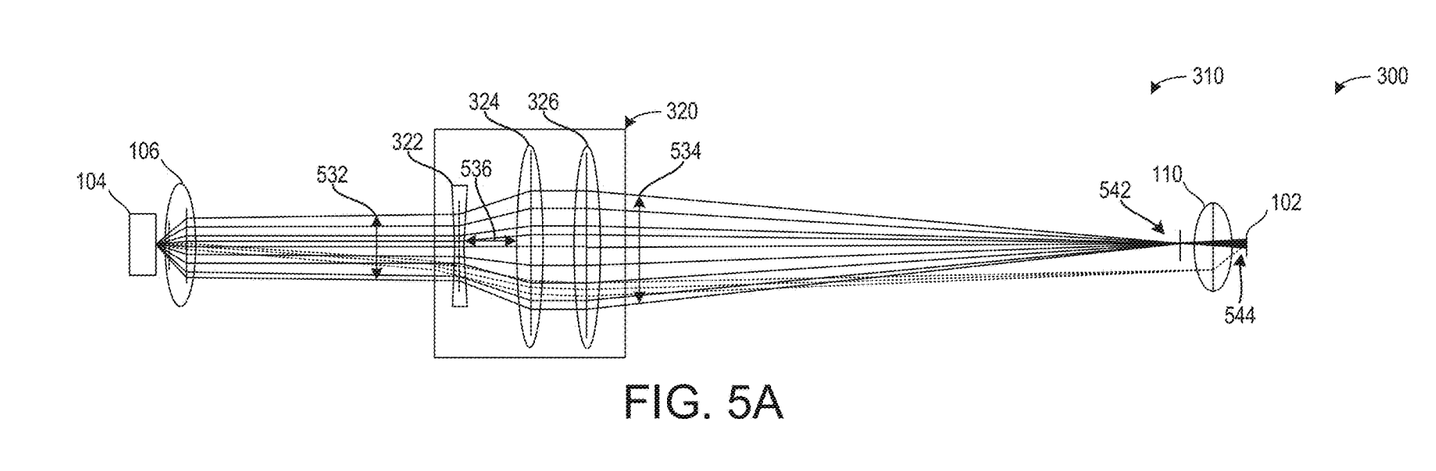
FIG. 5A shows a third layout of optics of the adaptive illumination system.
Figure 5B:
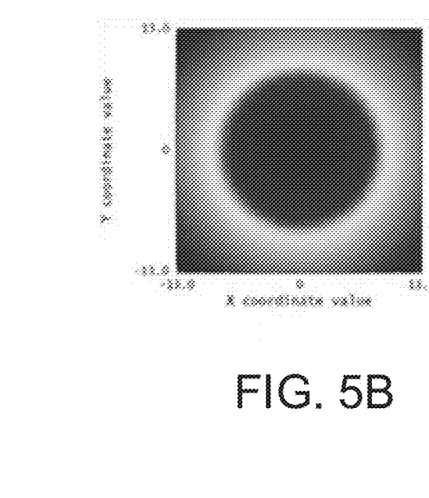
FIG. 5B shows a projected image on the back aperture of the focusing lens of the third layout of the adaptive illumination system.
Figure 5C:
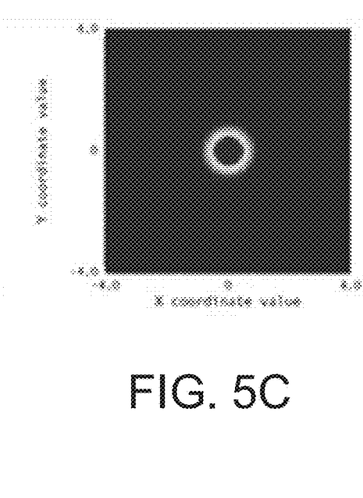
FIG. 5C shows a simulated illumination zone of the third layout at the target plane.
Figure 5D:
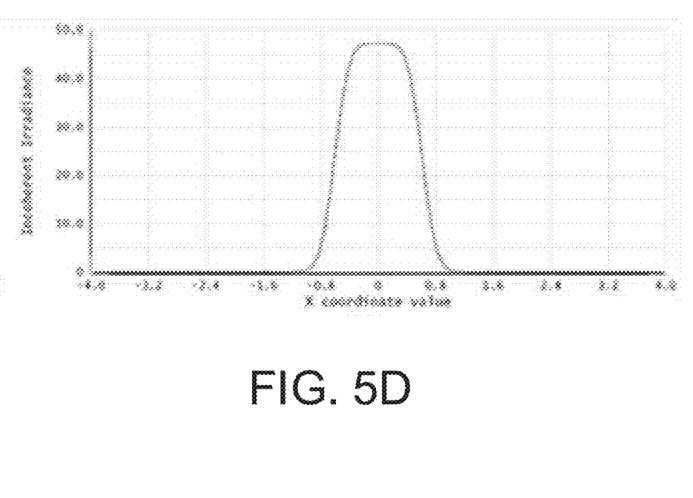
FIG. 5D shows a cross-section of irradiance intensity of the illumination zone of the third layout.
Figure 6:
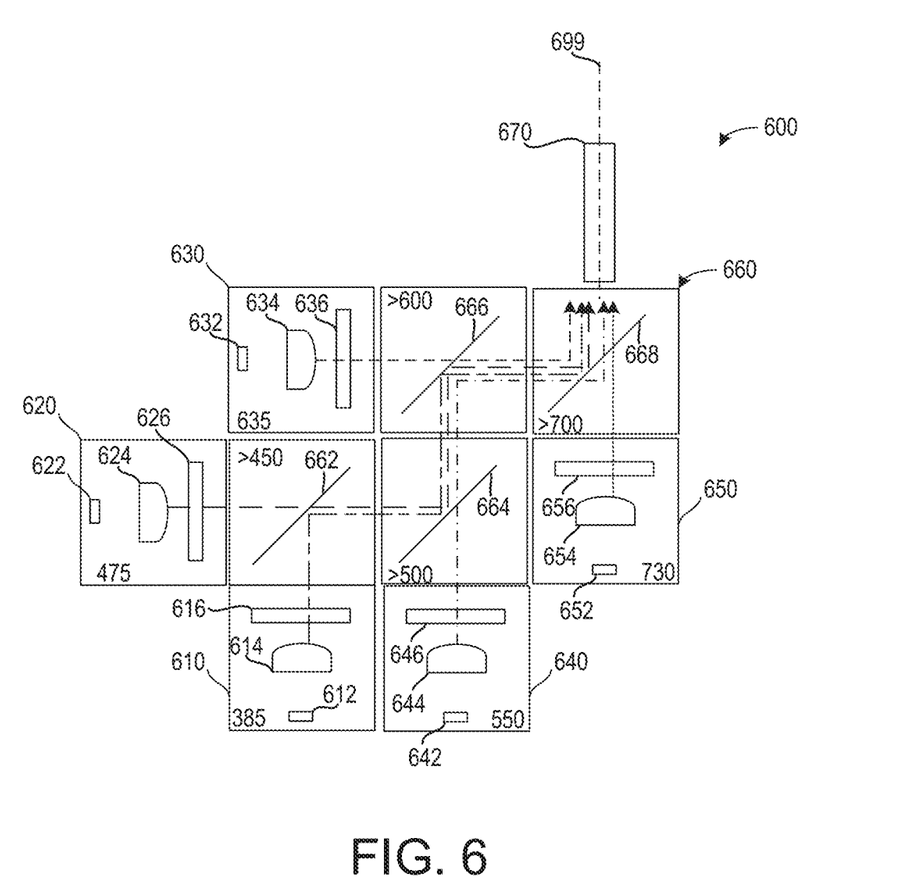
FIG. 6 shows an embodiment of an example of a multi-channel LED light source in which the adaptive illumination system may be incorporated.

FIG. 1 shows a previous example of an illumination system with limited adjusting capabilities. FIG. 2A shows a converging beam leans with a large cone angle and a converging beam lens with a small cone angle is shown in FIG. 2B. FIG. 3A illustrates a first layout of the adaptive illumination system. FIG. 3B shows a projected image on the back aperture of the focusing lens of the first layout of an adaptive illumination system. FIG. 3C shows a simulated illumination zone of the first layout at the target plane. FIG. 3D shows a cross-section of irradiance intensity of the illumination zone of the first layout. FIG. 4A shows a second layout of optics of the adaptive illumination system. FIG. 4B shows a projected image on the back aperture of the focusing lens of the second layout of the adaptive illumination system. FIG. 4C shows a simulated illumination zone of the second layout at the target plane. FIG. 4D shows a cross-section of irradiance intensity of the illumination zone of the second layout. FIG. 5A shows a third layout of optics of the adaptive illumination system. FIG. 5B shows a projected image on the back aperture of the focusing lens of the third layout of the adaptive illumination system. FIG. 5C shows a simulated illumination zone of the third layout at the target plane. FIG. 5D shows a cross-section of irradiance intensity of the illumination zone of the third layout. FIG. 6 shows an embodiment of an example of a multi-channel LED light source in which the adaptive illumination system may be incorporated.

In one embodiment, the adaptive illumination system may receive a semi-collimated input beam with a smaller beam waist and outputs a converged light cone with a variable larger beam waist, focal distance, and cone angle. A first negative optical element and a second positive optical element (e.g., from an input to an output) work together to expand the input semi-collimated beam to a desirable larger beam waist to achieve a desired output beam, which includes achieving a desired beam convergence angle and effective focal distance. The output beam waist may be controlled by an air gap of the negative and positive optical elements.

A last optical element in the adaptive illumination system provides a neutral focal distance of a final effective focal distance of the adaptive illumination system. In one example, this may be proximal to a middle point of an adjustable range of an effective focal distance. The effective focal distance of the adaptive illumination system may be reduced or increased via an air gap positioned between the first two elements.

When the air gap between the two optical elements is reduced, a slower converge light cone with a smaller initial beam waist may be produced. A corresponding light cone may pass through the illumination focusing lens, such as an objective lens or a condenser lens via a Kohler illumination scheme, may produce a smaller illumination zone with a larger maximum illumination angle. The large illumination angle may support a high numerical aperture imaging lens to provide a high-resolution image.

When the air gap between the two optical elements is increased, a faster converging light cone with larger initial beam waist will be produced. A corresponding light cone passing through the objective lens or the condenser lens via the Kohler illumination scheme may produce a leger illumination zone with a smaller maximum illumination angle. The smaller illumination angle may support a more desired configuration for fluorescence imaging applications.

Turning now to FIG. 1, it shows a previous example of an illumination system using a Kohler illumination. The Kohler illumination scheme may be used in imaging optics such as a microscope optical system. In the scheme, a target illumination plane 102 is positioned away from conjugated locations of a light source plane. As such, a spatial variation or undesired intensity structure produced in the light source may be reduced.

A light source 104, which may be a light-emitting diode (LED), may comprise a finite and/or a fixed dimension with some intensity distribution pattern, such as a Lambertian distribution. A collector lens 106, through which light from the light source 104 passes through, may collect emissions from the light source 104 and project the light toward an illuminator lens 108. The collector lens 106 may be a small lens with a threshold proximity of an emitting surface of the light source 104. The emitting surface may be a half-ball lens in an encapsulated LED, a single discrete lens, or a combination of multiple lenses. In this way, the collector lens may reduce color aberration and/or semi-collimated output beams to meet desired characteristics of the imaging application.

The illuminator lens 108 may be used to focus light from the collector lens 106 to a region of a back aperture plane of the focusing lens 110, which may be a condenser lens in a transmission mode imaging optics or an objective lens in a fluorescence mode of imaging optics using an epi-illumination scheme.

As shown in the previous example of FIG. 1, the target plane 102 of the illumination optics is not conjugated with the light source plane such that a condition of the Kohler illumination is satisfied. The converging beam 112, shown via solid lines, comprises a cone angle, a, produced via the illuminator lens 108, has an effect on determining a size of the illuminated zone on the target plane 102. In some examples, it is desired to evenly illuminate the illuminated zone. Conditions for the illumination may include where an intensity of uniformity may comprise less than or equal to a threshold intensity variation (e.g., 10%). In some examples, additionally or alternatively, the threshold intensity variation may be 5%, 2%, or lower. The cone angle, a, may be determined via a beam waist 116 measured from the converging beam 112 to marginal rays 114, illustrated via dashed lines, and a back focal distance of the illuminator lens.

In transmission imaging systems, there may be an additional focusing lens (e.g., an objective lens) behind the target plane 102 relative to a direction of light travel from the light source 104 along an axis. The objective lens may receive transmitted light through the sample of the target plane. In such an example, a maximum incident angle, (3, of the illumination may need to be large enough to fill the objective lens of high numerical aperture to provide a high-resolution imaging performance. The maximum illumination angle, (3, may be based on the marginal rays 114, which originate from an edge of the light source 104 to edges of its projected image at a back focal plane of the focusing lens. As a result, a larger projected light source image at the back aperture plane of the focusing lens 110 may produce a larger illuminating angle, which may not provide a large enough illumination zone at the target plane 102, which is determined by the focal length of the illuminator lens 108. Thus, the previous example of FIG. 1 may not be suitable for a variety of illumination schemes.

Turning now to FIGS. 2A and 2B, they show a first ray tracing 200 and a second ray tracing 250, respectively, of a converging beam focused at a back focal plane of the focusing lens with two different configurations. In the first ray tracing 200, a converging beam 202 with a large cone angle, a, produces a first illumination zone 204 on the target plant 102. In the second ray tracing 250, a converging beam 252 with a small cone angle, a, produces a second illumination zone 254, smaller than the first illumination zone 204. Correspondingly, an LED image length 212, measured from the converging beam 202 to marginal rays 214 in the first ray tracing 200 is smaller than an LED image length 262, measured from the converging beam 252 to marginal rays 264 in the second ray tracing 250. Thus, the illumination optics of the first ray tracing 200 project a smaller LED image at the back focal plane of the focusing lens 110, resulting in a smaller maximum illumination angle, β, relative to the illumination angle illustrated in the second ray tracing 250.

As shown in the examples of FIGS. 2A and 2B, an illumination zone size (e.g., illumination zone 204 of FIG. 2A and illumination zone 254 of FIG. 2B) and illumination angle may be adjusted by adjusting a converging cone angle and the LED image size on the back aperture of focusing lens 210. In the examples of FIGS. 3A to 5D, an optical system comprises an adaptive illuminator lens which may provide various illumination zone sizes and illumination angles to meet different illumination schemes, which the previous example of FIG. 1 fails to accomplish.

Turning to FIG. 3A, it shows a first layout 300 of an adaptive illumination system 310. The adaptive illumination system 310 comprises an adaptive illuminator 320 comprising at least three optical elements configured to provide various illumination schemes. A first optical element 322 of the adaptive illuminator 320 may be a negatively powered optical element configured to expand an incoming beam waist 332. The second optical element 324 may be a positively powered optical element configured to cooperatively operate with the first optical element 322 to generate a desired beam waist changing effect. In one example, the first optical element 322 is concave and the second optical element 324 is convex. The first and second optical elements may be further configured to determine a collimation specification of an exit beam to be slightly diverging, semi-collimated, or converging. In the first layout 300, a first distance 336 is arranged between the first optical element 322 and the second optical element 324, which corresponds to an air gap, wherein the first distance 336 sets a specific exit beam waist (e.g., outgoing beam waist 334) and effective back focal distance of the adaptive illuminator 320.

In one example, the first distance 336 in FIG. 3A is a neutral value relative to the distances shown in FIGS. 4A and 5A. The first distance 336 in FIG. 3A provides a "middle" value of the convergence of the exit beam for light rays originated from the on-axis part of the light source 104. In such configuration, the focal length of the adaptive illuminator 320 assembly is approximately equal to a focal distance of the last element, lens 326, in the assembly. A distance between the second optical element 324 and a third optical element 326 may have less of an effect on the exit beam waist and beam collimation. As such, the distance may be minimized and/or reduced to zero for packaging reasons.

Using the first layout as an example, the outgoing beam waist 334 formed by the adaptive illuminator 320 may be computed based on equation 1 shown below:

$$\Delta W = (W_2 - W_1) = 2d \cdot \tan[\sin^{-1}(NA_{neg})] \quad \text{Equation 1}$$

In Equation 1, $W_1$ and $W_2$ correspond to the incoming beam waist 332 and outgoing beam waist 334 outside of the adaptive illuminator 320, respectively. $NA_{neg}$ corresponds to a numerical aperture of the first optical element 322.

In the example of FIG. 3A, diameters of the optical elements of the adaptive illuminator 320 may be less than or equal to 50 mm. However, it will be appreciated that the optical elements may comprise diameters greater than 50 mm. The first distance 336 may be equal to 25 mm. A numerical aperture of the first optical element may be equal to 0.17. Thus, based on equation 1, the beam waist is increased by 8.6 mm. A focal distance of the adaptive illuminator is about 150 mm, which is about the same as the last element. The first layout 300 further comprises where the converging beam cone angle 342 is approximately 8 degrees. The light source 104 is a 1 mm circular LED with an angular intensity distribution following Lambert's cosine law. A projected image on a back focal plane of the focusing lens is about 8.5 mm in diameter is shown in FIG. 3B. An illumination incident angle 344 is approximately 25 degrees, which is equal to an illumination numerical aperture of about 0.42. A simulated illumination zone at the target plane 102 is illustrated in FIG. 3C. A cross-section irradiance intensity of the illumination zone is plotted in FIG. 3D. In the plot of FIG. 3D, the cross-section illustrates a uniform flat region comprising a diameter of approximately 1.8 mm.

Turning now to FIG. 4A, it shows a second layout 400 of the adaptive illumination system 310. The second layout 400 comprises a second distance 436 between the first optical element 322 and the second optical element 324. As described above, a distance between the second optical element 324 and the third optical element 326 may have little to no effect on the illumination conditions, as such, the distance between the second and third optical elements in the second layout 400 may be equal to the distance in FIG. 3A. In one example, the second distance 436 is greater than the first distance 336 of FIG. 3A. In one example, the first optical element 322 is moved to a second position, away from a first position of the first layout 300. The second position may represent a position of a range of position of the first optical element 322 corresponding to a maximum distance between the first optical element 322 and the second optical element 324. In one example, the second distance 436 is equal to 65 mm.

The adaptive illuminator 320 may produce a converging beam of a larger cone angle 442 equal to 29 degrees, which is greater than the cone angle 342 of the first layout 300 of FIG. 3A. The larger cone angle 442 is due to both the enlarged outgoing beam waist 434 and a reduced focal distance. The outgoing beam waist 434 is equal to 40 mm, greater than the incoming beam waist 432, and the focal distance is reduced to 65 mm, relative to the first layout 300 of FIG. 3A. The illumination zone is increased from 1.8 mm in the first layout 300 of FIG. 3A to 5.8 mm, as shown in FIGS. 4C and 4D. The LED image projected at the back focal plane of the focusing lens 110 is reduced from 8.5 mm to 1 mm in diameter as shown in FIG. 4B. As such, the illumination incident angle is reduced from 25 degrees to 13 degrees, which is equivalent to a numerical aperture of 0.22.

Turning now to FIG. 5A, it shows a third layout 500 of the adaptive illumination system 510. The third layout 500 comprises a third distance 536 between the first optical element 322 and the second optical element 324. The first optical element 322 is moved to a third position, corresponding to a second extreme position of a range of positions of the first optical element 322. A difference between an incoming beam waist 532 and an outgoing beam waist 534 is a smallest difference relative to all other positions of the first optical element 322. That is to say, the second position illustrated in FIG. 4A is a first extreme position with a maximum distance (e.g., the second distance 436) between the first and second optical elements. The second extreme position thus corresponds to a minimum distance, represented by the third distance 536, between the first and second optical elements. In one example, the third distance is 15 mm. In this way, the first position of the first layout 300 of FIG. 3A is closer to the third position than the second position despite the first position providing illumination conditions between the second layout 400 conditions and the third layout 500 conditions.

The third layout 500 comprises where the adaptive illuminator 320 produces a converging beam cone angle 542 of 4.2 degrees. The illumination zone at the target plane 102 is 0.8 mm in diameter as shown in FIGS. 5C and 5D. The projected LED image size is increased to 16 mm in diameter as shown in FIG. 5B. This may produce a maximum illumination angle of 50 degrees with a numerical aperture of 0.77.

In this way, the examples of FIGS. 3A, 4A, and 5A illustrate different example positions of the adaptive illuminator 320 of the adaptive illumination system 310. The adaptive illumination system is configured to balance an illumination zone size with a maximum incident angle based on the conservation of etendue. The illumination characteristics may be adjusted by adjusting the distance and/or the air gap between two or more optical elements of the adaptive illuminator 320. More specifically, the air gap between the first optical element (e.g., the negatively powered element) and the second optical element (e.g., the positively powered element) is adjusted so that different modes of operation of the adaptive illumination system 310 may be achieved without replacing optical elements. The first optical element is adjusted to a first extreme position (illustrated in FIG. 4A), a second extreme position (illustrated in FIG. 5A), or a plurality of positions therebetween in response to a request to adjust an illumination zone size or an illumination zone angle. Actuating the first optical element toward the first extreme position increases the illumination zone size and decreases the illumination incident angle whereas adjusting the first optical element toward the second extreme position decreases the illumination zone size and increases the illumination incident angle.

The first optical element 322 or the second optical element 324 may be manually adjusted via a user until a desired characteristic is achieved. Additionally or alternatively, in some example, an actuator of the adaptive illumination system 310 may be configured to actuate either the first optical element 322 or the second optical element 324 to or away from the other within the range covering the second position and the third position described above. The actuator may be electrically or manually operated.

In one embodiment, the adaptive illumination system 310 comprises an interface. The interface may comprise a plurality of options corresponding to various illumination modes. A user may select one or more desired illumination characteristics, which may be input to a controller of the adaptive illumination system 310. The controller may comprise instructions stored on non-transitory memory thereof that when executed enable the controller to adjust a distance between the first optical element and the second optical element based on the user selected inputs. In this way, the adaptive illumination system may quickly adjust illumination characteristics to provide different illumination modes without replacing optical elements.

As described above, the adaptive illuminator system 310 may enlarge an output beam waist. By doing this, the upstream optics may be designed with a smaller optic for a smaller beam waist. Thus, a size of the light source unit may be reduced, which may allow a greater number of light sources of different wavelengths to be arranged in the light source. A multi-channel LED Light source 600 is illustrated in FIG. 6. Therein, wavelength selecting components, such as dichroic mirrors or filters may be used for channel combining. By using smaller beams, a cost of the dichroic mirrors may be reduced, thereby further decreasing a cost of the adaptive illuminator system 310. Furthermore, the physical size of the light source assembly is reduced, which may allow it to be integrated with other components to form a variety of complete functioning systems.

More specifically, the multi-channel LED light source 600 of a multi-light arrangement comprises the first light source 610, the second light source 620, the third light source 630, the fourth light source 640, and the fifth light source 650. In one example, the multi-channel LED light source 600 may be used instead of the light source 104 of FIGS. 3A, 4A, and 5A with the adaptive illumination system 310.

The first light source 610 comprises a first LED 612, a first LED lens 614, and a first filter 616. The LED lens 614 can be a singlet, a doublet, or a multi-element lens. The filter 616 is optional, which provides further refinement of the LED emitting spectrum. One or more of the following LED lenses and the filters may also be optional. The first light source 610 emits a light of a first wavelength toward the plurality of dichroic mirrors 660, wherein the light is reflected off the first dichroic mirror 662, reflected off the second dichroic mirror 664, reflected off the third dichroic mirror 666, and then reflected off the fourth dichroic mirror 668 before reaching the output 670.

The second light source 620 comprises a second LED 622, a second LED lens 624, and a second filter 626. The second light source 620 emits a light of a second wavelength toward the plurality of dichroic mirrors 660, wherein the light traverses the first dichroic mirror 662, reflects off the second dichroic mirror 664, reflects off the third dichroic mirror 666, and reflects off the fourth dichroic mirror 668 before reaching the output 670.

The third light source 630 comprises a third LED 632, a third LED lens 634, and a third filter 636. The third light source 630 emits a light of a third wavelength toward the plurality of dichroic mirrors 660, wherein the light traverses the third dichroic mirror 666 and reflects off the fourth dichroic mirror 668 before reaching the output 670.

The fourth light source 640 comprises a fourth LED 642, a fourth LED lens 644, and a fourth filter 646. The fourth light source 640 emits a light of a fourth wavelength toward the plurality of dichroic mirrors 660, wherein the light traverses the second dichroic mirror 664, reflects off the third dichroic mirror 666, and reflects off the fourth dichroic mirror 668 before reaching the output 670.

The fifth light source 650 comprises a fifth LED 652, a fifth LED lens 654, and a fifth filter 656. The fifth light source 650 emits a light of a fifth wavelength toward the plurality of dichroic mirrors 660, wherein the red light traverses the fourth dichroic mirror 668 before reaching the outlet 670.

In one example, the first through fifth wavelengths are between 350 to 750 nm. Each of the first through fifth wavelengths may be configured to emit different colors of light such that each of the first through fifth wavelengths are different. In one example, the first wavelength is 385 nm, the second wavelength is 475 nm, the third wavelength is 635 nm, the fourth wavelength is 550 nm, and the fifth wavelength is 730 nm. It will be appreciated that other wavelengths, and therefore colors, may be emitted without departing from the scope of the present disclosure. As illustrated, the outlet 670 aligns the light beam with an axis 699. The light beam may deviate from the axis 699 before reaching a target plane (e.g., target plane 102 of FIGS. 3A, 4A, and 5A).

In multi-channel LED light source 600, the dichroic mirrors form a linear waveguide to bounce the light beams from each source into the output light guide. The light beams of all channels, except the lowest-wavelength channel, go through one dichroic mirror at 45° incidence angle into the waveguide and then will be reflected by the rest of dichroic mirrors downstream. For example, 730-nm light goes through 700-nm long-pass (LP) dichroic mirror and into the light guide. The 550-nm light goes through 500-nm LP dichroic mirror and then is reflected by the 600-nm and 700-nm dichroic mirrors. The 385-nm light travels a transmission-free entrance into the waveguide and four reflections before entering the light guide, which experiences still less loss than one transmission loss.

In addition to the improved optical efficiency, this linear waveguide arrangement of the dichroic mirrors also allows new channel to be added in with minimum disturbance to the existing configuration and performance.

The above figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of the adaptive illumination system is to provide a variety of illumination modes by adjusting a distance and/or an air gap between optical elements of an adaptive illuminator. The optical elements may include at least one negatively powered optical element and at least one positively powered optical element. The adaptive illumination system is further configured to increase a beam waist such that a smaller beam waist may be used as a light source, which may enable the light source to provide a variety of wavelengths of light. This decreases a light source cost and reduces a packaging size. In this way, the adaptive illumination system provides an illumination system configured to executed multiple illumination modes by adjusting an optical element therein without replacing or interchanging elements therein. By doing this, operating costs may be reduced and efficiency may be increased.

An example of an adaptive illumination system, comprises an adaptive illuminator comprising at least three optical elements including a first optical element, a second optical element, and a third optical element, wherein a distance between the first optical element and the second optical element is adjustable. A first example of the adaptive illumination system further includes where the first optical element has negative optical power and the second optical element has positive optical power. A second example of the adaptive illumination system, optionally including the first example, further includes where the third optical element has positive optical power. A third example of the adaptive illumination system, optionally including one or more of the previous examples, further includes where the first optical element is moveable through a range, wherein the range comprises a first extreme position and a second extreme position. A fourth example of the adaptive illumination system, optionally including one or more of the previous examples, further includes where the first extreme position comprises where the distance is a maximum distance. A fifth example of the adaptive illumination system, optionally including one or more of the previous examples, further includes where the second extreme position comprises where the distance is a minimum distance. A sixth example of the adaptive illumination system, optionally including one or more of the previous examples, further includes where a neutral position between the first extreme position and the second extreme position, wherein the neutral position is between the first and second extreme positions. A seventh example of the adaptive illumination system, optionally including one or more of the previous examples, further includes where a light source, wherein the light source comprises a plurality of light sources, such as incandescent lights, gas-discharge lamp, light emitting diodes, laser sources, halogen lights, and mercury lamps, each configured to emit a beam of light of a different wavelength toward one or more of a plurality of collection and reflective light guiding optical components.

An example of an adaptive illuminator of an adaptive illumination system comprising a light source, a collector lens, a focusing lens, and a target plane, the adaptive illuminator, comprises a first optical element comprising a negatively powered optic, a second optical element comprising a positively powered optic, and a third optical element comprising a positively powered optic, wherein the first optical element is moveable along an axis along which light is emitted from the light source. A first example of the adaptive illuminator further includes where the first optical element is configured to move to a first extreme position in response to a request to increase an illumination zone size and decrease the maximum illumination incident angle. A second example of the adaptive illuminator, optionally including the first example, further includes where the first optical element is configured to move to a second extreme position in response to a request to decrease the illumination zone size and increase the maximum illumination incident angle. A third example of the adaptive illuminator, optionally including one or more of the previous examples, further includes where the first optical element is moved via an electric or a manual actuator. A fourth example of the adaptive illuminator, optionally including one or more of the previous examples, further includes where the first optical element is moveable along the axis between the second optical element and the collector lens, wherein the first optical element is moved to adjust a distance between the first optical element and the second optical element. A fifth example of the adaptive illuminator, optionally including one or more of the previous examples, further includes where increasing the distance increases an illumination zone size and decreases the maximum illumination incident angle, and wherein decreasing the distance decreases the illumination zone size and increases the maximum illumination incident angle. A sixth example of the adaptive illuminator, optionally including one or more of the previous examples, further includes where the second optical element and the third optical element are immovable.

An adaptive illumination system, comprises a light source configured to emit light along an axis through a first lens and a second lens of the adaptive illuminator toward a target plane, and an adaptive illuminator arranged between the first lens and the second lens, the adaptive illuminator comprises a first optical element moveable along the axis to and away from a second optical element to adjust an air gap therebetween, the adaptive illuminator further comprising a third optical element arranged behind the second optical element in the adaptive illuminator. A first example of the adaptive illumination system further includes where the first optical element is moveable to a first extreme position, a second extreme position, and a plurality of positions therebetween, wherein the air gap is largest when the first optical element is in the first extreme position, and wherein the air gap is smallest when the first optical element is in the second extreme position. A second example of the adaptive illumination system, optionally including the first example, further includes where the first optical element has negative optical power, the second optical element has positive optical power, and the third optical element has positive optical power, and wherein the light source provides a beam with a first beam waist, and wherein the first optical element, the second optical element, and the third optical element output the beam with a second beam waist, wherein the second beam waist is larger than the first beam waist. A third example of the adaptive illumination system, optionally including one or more of the previous examples, further includes where the light source comprises a plurality of light sources each including a light sources, such as incandescent lights, gas-discharge lamp, light emitting diodes, or laser sources, configured to emit a beam of light toward one or more of a plurality of spectrally selective optical components oriented identically to one another, wherein the plurality of spectrally selective optical components is configured to direct the beam of light along the axis. A third example of the adaptive illumination system, optionally including one or more of the previous examples, further includes where the plurality of spectrally selective optical components are dichroic mirrors.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An adaptive illuminator of an adaptive illumination system, the adaptive illumination system comprising a light source, a collector lens, the adaptive illuminator, a focusing lens, and a target plane, the adaptive illuminator comprising:
   a first optical element comprising negative optical power;
   a second optical element comprising positive optical power; and
   a third optical element comprising positive optical power;
      wherein the first optical element is moveable along an axis along which light is emitted from the light source, wherein the second optical element and the third optical element are immoveable along the axis, wherein light from the light source travels directly from the first optical element to the second optical element and from the second optical element to the third optical element, and wherein the adaptive illuminator receives a semi-collimated input beam and outputs a converged light cone.

2. The adaptive illuminator of claim 1, wherein the first optical element is configured to move to a first extreme position in response to a request to increase an illumination zone size and decrease the maximum illumination incident angle.

3. The adaptive illuminator of claim 2, wherein the first optical element is configured to move to a second extreme position in response to a request to decrease the illumination zone size and increase the maximum illumination incident angle.

4. The adaptive illuminator of claim 1, wherein the first optical element is moved via an electric or a manual actuator, and wherein the adaptive illuminator consists of the first optical element, the second optical element, and the third optical element.

5. The adaptive illuminator of claim 1, wherein the first optical element is moveable along the axis between the second optical element and the collector lens, and wherein the first optical element is moved to adjust a distance between the first optical element and the second optical element.

6. The adaptive illuminator of claim 5, wherein increasing the distance increases an illumination zone size and decreases the maximum illumination incident angle, and wherein decreasing the distance decreases the illumination zone size and increases the maximum illumination incident angle.

7. The adaptive illuminator of claim 1, wherein the light source comprises a plurality of light sources, and wherein the plurality of light sources include one or more of incandescent lights, gas-discharge lamp, light emitting diodes, laser sources, halogen lights, and mercury lamps, each configured to emit a beam of light of a different wavelength toward one or more of a plurality of collection and reflective light guiding optical components.

* * * * *